Sept. 6, 1960 M. H. SUBILIA 2,951,411

MODULE RISER CUTTER

Filed Feb. 2, 1956 5 Sheets-Sheet 1

Maurice H. Subilia
*INVENTOR.*

Sept. 6, 1960 M. H. SUBILIA 2,951,411

MODULE RISER CUTTER

Filed Feb. 2, 1956 5 Sheets-Sheet 2

Maurice H. Subilia
*INVENTOR.*

Sept. 6, 1960 M. H. SUBILIA 2,951,411

MODULE RISER CUTTER

Filed Feb. 2, 1956 5 Sheets-Sheet 3

Maurice H. Subilia
INVENTOR.

Maurice H. Subilia
*INVENTOR.*

Sept. 6, 1960 M. H. SUBILIA 2,951,411

MODULE RISER CUTTER

Filed Feb. 2, 1956 5 Sheets-Sheet 5

Maurice H. Subilia
*INVENTOR.*

United States Patent Office 2,951,411

Patented Sept. 6, 1960

2,951,411

MODULE RISER CUTTER

Maurice H. Subilia, Windham, N.H., assignor, by mesne assignments, to Sanders Associates, Inc., Nashua, N.H., a corporation of Delaware Filed Feb. 2, 1956, Ser. No. 563,036

1 Claim. (Cl. 83—618)

This invention relates generally to mounting devices for electrical and electronic components and more particularly to modules and their manufacture. More specifically, the invention relates to a cutter for module riser wires.

Electronic circuitry and wiring has become so intricate that a great deal of attention has recently been directed to the problem of its automatic manufacture. A recent innovation in this regard is the development of electronic circuit building blocks, or modules, which are particularly adapted to automatic manufacture. Such modules are described in an article entitled "Project Tinkertoy," volume 11, November 1953, National Bureau of Standards Technical News Bulletin. Modules of the type described comprise a plurality of congruently stacked insulating panels termed wafers which carry the electronic components. The wafers are interconnected and supported in spaced relation by a plurality of conductors attached to the edges of the wafers and symmetrically surrounding them. These conductors are termed module riser conductors or module riser wires. In the manufacture of modules of the type described, it has heretofore been a problem to simultaneously cut the riser wires extending from the module and to cut them with a uniform length.

It is therefore an object of the invention to provide an improved cutter for module riser wires.

It is a further object of the invention to provide an improved cutter for module riser wires, whereby all the wires extending from one end of a module may be simultaneously cut to a given length.

In accordance with the invention there is provided a device for cutting riser wire of electronic modules. The device comprises a base and a first member having a flange attached to the base. The first member has a side normal to the base in which there is a centrally disposed aperture and four recesses radially disposed in quadrature with respect to the aperture. A second member is supported by the flange normal to the base and has a centrally disposed opening and an annular depressed area facing towards the first member side coaxial with the opening and having a sector extending to one end of the second member. Four pins are disposed in quadrature and mounted normal to the surface of the area. A third member intermediate and coaxial with the first and second members has four radially elongated slots mating with the pins and a centrally disposed rectangular anvil. The rectangular anvil is substantially surrounded by four elongated apertures for forming a support for the wires. Four cutting members are slidably disposed in the recesses of the first member. The cutting members are attached to the pins of the second member and have cutting edges disposed adjacent the elongated apertures of the third member for co-operating with the anvil. In addition, the cutting members and pins are removable as a unit to facilitate replacement as the cutting edges wear.

An operating lever rotatable about an axis has a handle and an annular extension. The annular extension has four arcuate quadrature disposed elongated slots mounted in the depressed area of the second member with each of the arcuate slots mating with one of the plurality of pins. Additionally, each of these arcuate slots is symmetrical about a radius perpendicular to and passing through the axis of rotation, and each of the arcuate elongated slots is of such arc and position that the radii from the axis of rotation of the lever to the extremities of each of the slots are longer than any radius to an intermediate point on the inner edge of the slot. In operation, a single rotary motion of the operating lever and the arcuate slots through an acute angle causes reciprocating shuttling motion of the cutting members across the elongated apertures in the third member to cut riser wires extending therethrough.

For a better understanding of the invention, together with other and further objects thereof, reference is made to the following description taken in connection with the accompanying drawings and its scope will be pointed out in the appended claim.

*Description*

Figure 1:
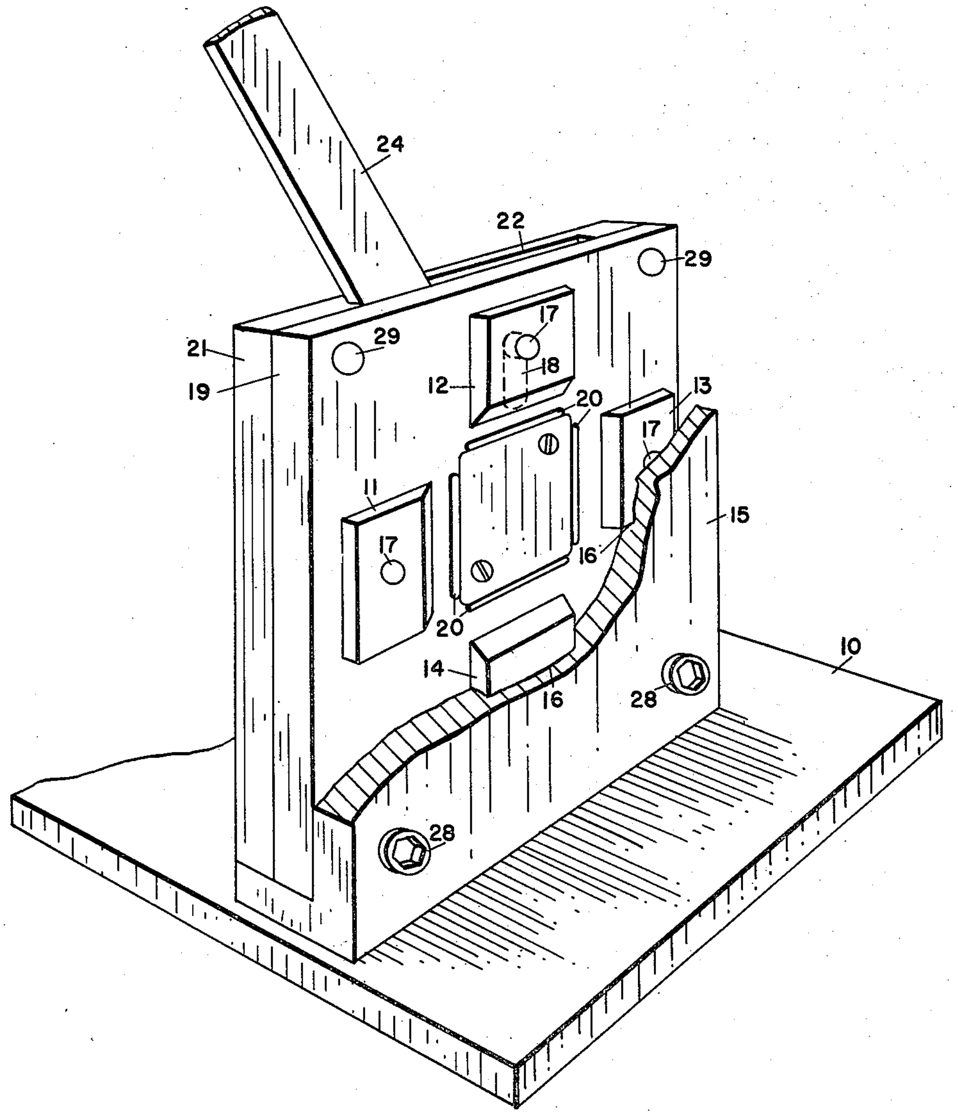
Fig. 1 is a partially fragmentary, side perspective view of a module riser wire cutter embodying the invention.

Referring now to the drawings, and with particular reference to Figs. 1–4, inclusive, a module riser wire cutter embodying the present invention will be considered in more detail. The cutter comprises a mounting surface 10 to which are coupled a plurality of radially disposed cutter blades 11–14, inclusive. Pairs of the cutter blades are oppositely disposed along perpendicular axes and are supported by a perpendicularly extending supporting member 15 which is affixed to the mounting surface 10 by suitable bolts, such as 30 in Fig. 3. The cutter blades are maintained in place by a plurality of guide channels 16, one for each blade, formed in the member 15 and radially disposed in quadrature. Actuator pins 17 are affixed to the blades 11–14, inclusive, and extend through slots 18 in a second supporting member 19 parallel and affixed to the first supporting member 15. The member 19 includes a plurality of slots 20 for positioning module riser wires to be cut. A third supporting member 21 is also parallel and affixed to the first supporting member 15 and the second supporting member 19 as shown. The supporting members 15, 19 and 21 are secured together by means of threaded bolts 28 as shown which are screwed in threaded holes 29 tapped in the member 21.

Figure 2:
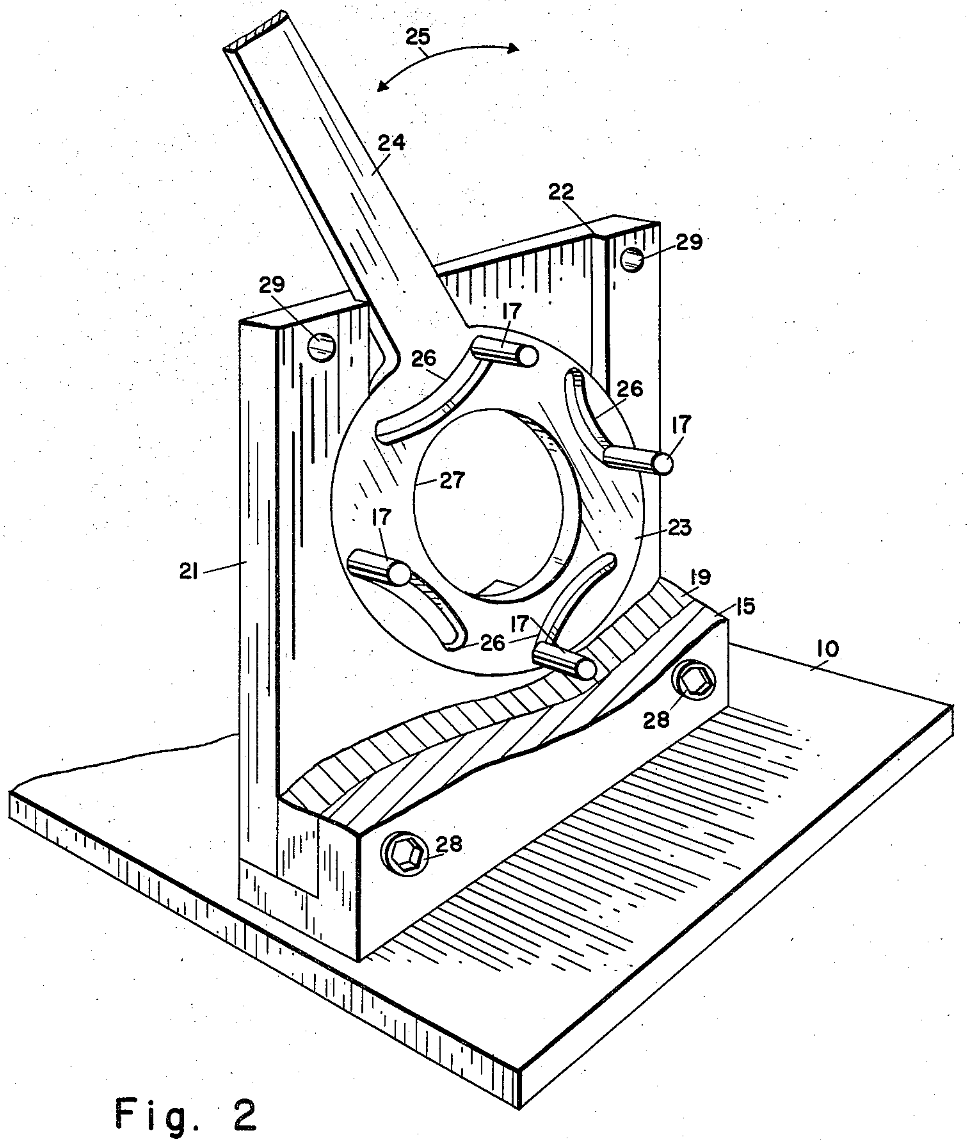
Fig. 2 is a side perspective view of a part of the cutter in Fig. 1 illustrating an aspect of the invention.
Figure 3:
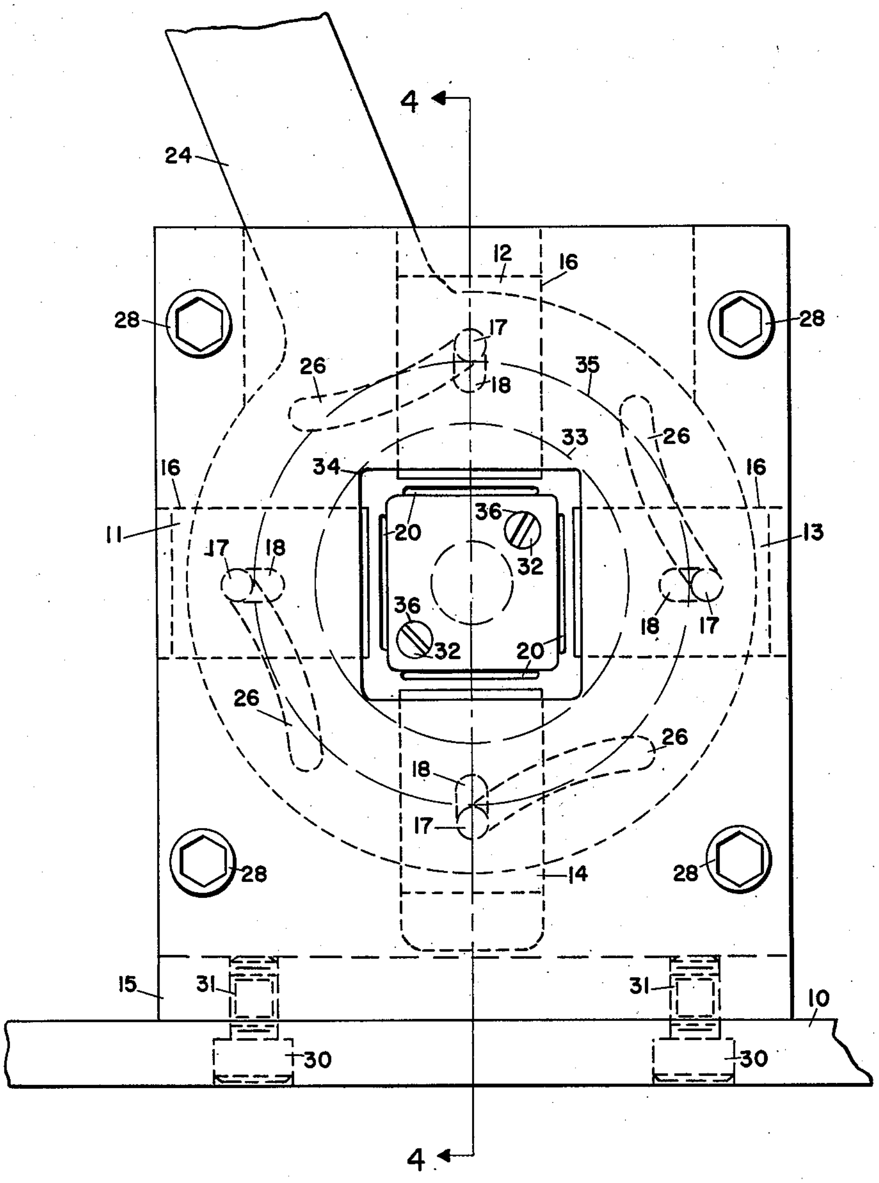
Fig. 3 is a front view of the embodiment in Fig. 1.

Referring now more particularly to Figs. 2 and 3, the supporting member 21 has a groove 22 terminating in a circular recess formed therein, as shown, to support and facilitate the rotation of an annular cam member 23. A lever 24 is attached to the cam 23 to provide rotary motion as indicated by arrow 25. A plurality of quadrantly disposed arcuate slots 26 are formed in the cam. The pins 17 affixed to the cutter blades extend through and are adapted for movement in the slots 26. The cam 23 has a central circular opening 27 formed therein.

Figure 4:
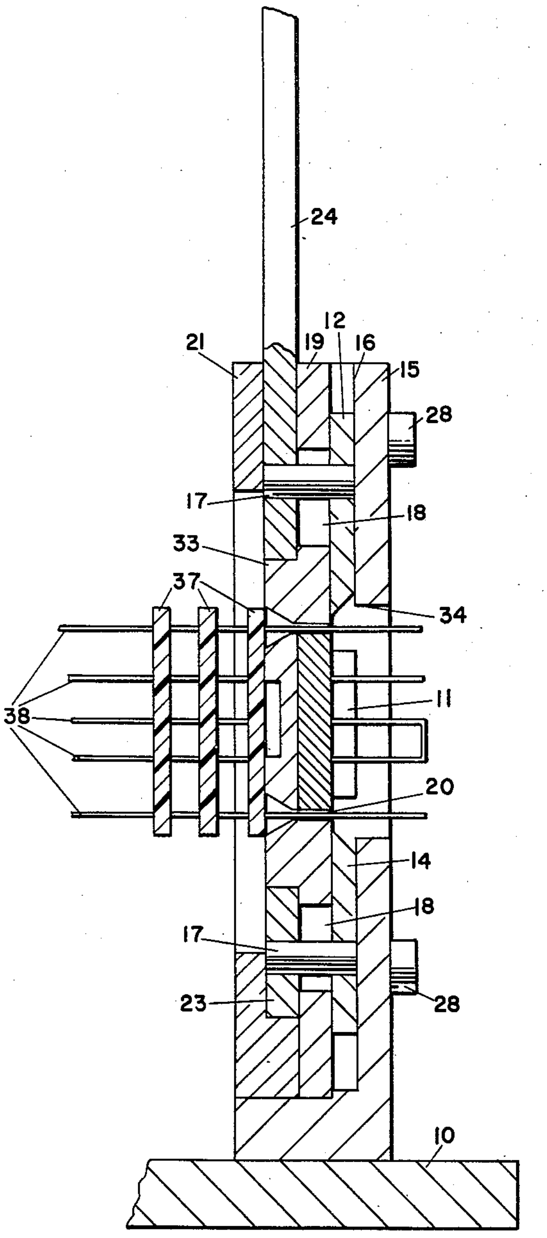
Fig. 4 is a sectional view of the embodiment in Fig. 3 taken along the lines 4—4 and illustrating a module inserted in place preparatory to cutting.

In Figs. 3 and 4 it may be seen that the slots 18 constrain the pins 17 of the blades 11 and 13 to horizontal motion while the pins 17 of the blades 12 and 14 are constrained to vertical motion. The pairs of slots 18 and 26 cooperate to determine the respective horizontal or vertical positions of the pins 17, and, hence, the blades 11, 13 and 12, 14. The slots 26 are so formed in the cam 23 that the radii from the axis of rotation of the cam 23 to the extremities of a given slot are longer than any radius to an intermediate point on the inside edge of the given slot 26. A supporting disk 33 is inserted in the central opening of the cam 23 and affixed to the second supporting member 19, threaded screws 32 being secured to threaded holes 36 in the disk (see Fig. 3). The motion of the blades 11–14 is thus radial in the direction of the axis of rotation of the cam 23. The circular central opening 27 provides support for the cam and enables it to rotate about the disk 33, the axis of rotation coinciding with the center of the disk. A rectangular port 34 is formed in the outer member 15 to provide clearance for the severed pieces of riser wire. A circular port 35 is formed in the other outer member 21 to provide access to the cutter blades for the modules. The diameter of the port 35 is less than that of the circular recess formed on the interior side of the member 21. The sectional view of Fig. 4 illustrates a module with its riser wires 38 inserted in the slots 20 preparatory to cutting the ends of the riser wires.

Figure 5:
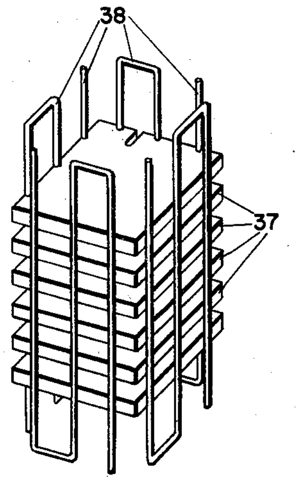
Fig. 5 is a perspective view of a module.

Referring now to Fig. 5, a module having a plurality of wafers 37 and riser wires 38 with their ends uncut is illustrated. Some of the riser wires are inter-connected at their ends in an S shape. As illustrated in Fig. 1, the configuration of the slots 20 in the supporting member 19 permits the ends of the riser wires to be inserted including the connections therebetween.

Figure 6:
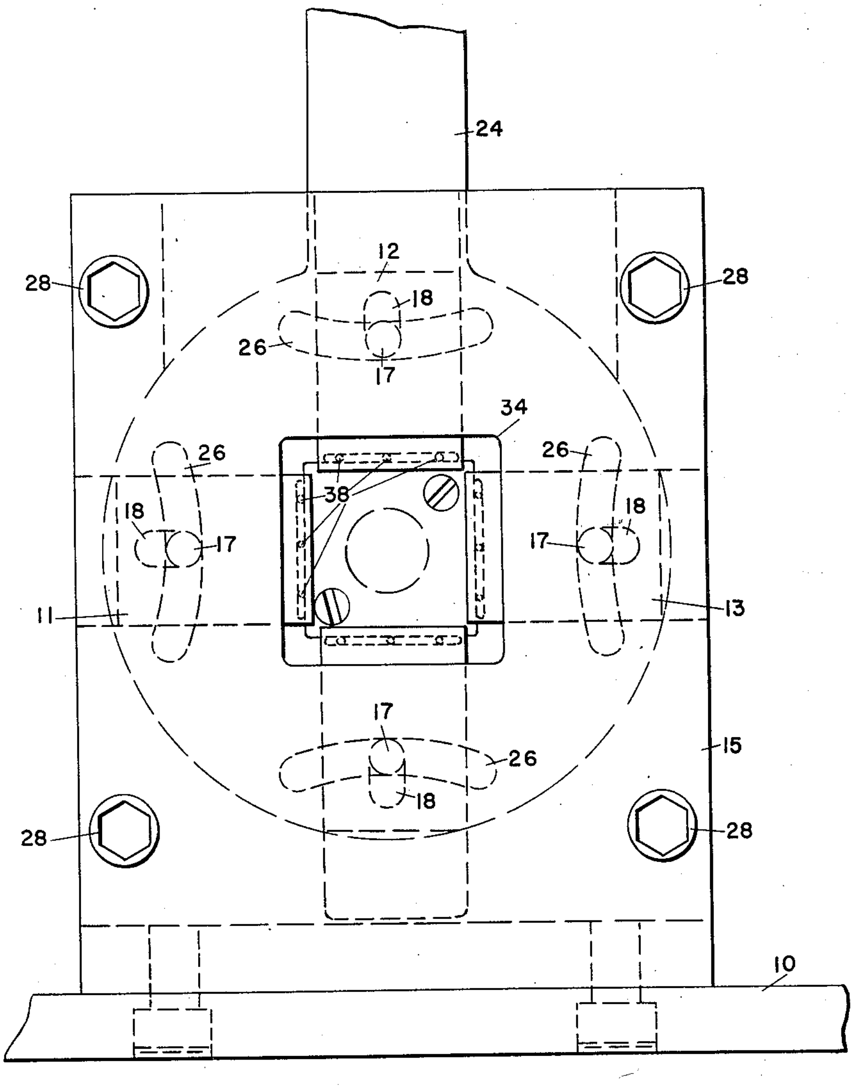
Fig. 6 is a front view of the embodiment in Fig. 4 with the module inserted in place after cutting.

In Fig. 6 the cutter is shown with the lever 24 in its center position corresponding with the blades 11–14 being fully indrawn toward the axis of rotation of the cam 23. Since the slots 18 and 26 cooperate to determine the location of the pins 17, as described above, the pins are here shown located centrally relative to the arcuate slots 26 and adjacent the inner extremities of the slots 18 in the member 19.

It will be apparent from the above description that the cam when rotated in a given direction, for example clockwise, from one extreme position of the arcuate slots 26 to the other, the blades 11–14 move from a maximum centrifugal or withdrawn position to a maximum centripetal or indrawn position and then back to a maximum centrifugal or withdrawn position as the cam 23 is rotated from the extreme left, to the center, and to the extreme right positions, respectively. Thus, a single rotation in a given direction of the cam produces reciprocating, radial shuttling of the cutter blades.

Since the cutter blades are confined within the shoulders provided by the grooves 17 in the member 15 on the one side and the member 19 on the other side, the motion of the cutter blades is restricted to that of a radial motion. The degree of displacement of the cutter blades is a function of the configuration of the arcuate slots 26. In the instant case it was decided to achieve 1/16 of an inch motion of the cutter blades; hence, the arcs of the slots 26 subtend an angle of 30° and their corresponding central radii are 1⅜ inches long.

While there has been described what is at present considered to be the preferred embodiment of this invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

A device for cutting riser wires of electronic modules, comprising: a base; a first member having a flange attached to said base and a side normal to said base having a centrally disposed aperture and four recesses radially disposed in quadrature with respect to said aperture; a second member supported by said flange, normal to said base, having a centrally disposed opening and an annular depressed area in said second member facing toward said first member side coaxial with said opening and having a sector extending to one end of said second member, and four pins disposed in quadrature and mounted normal to the surface of said area; a third member intermediate and coaxial with said first and second members having four radially elongated slots mating with said pins and a centrally disposed rectangular anvil substantially surrounded by four elongated apertures for forming a support for said wires; four cutting members slidably disposed in said recesses of said first member, attached to said pins of said second member and having cutting edges disposed adjacent said elongated apertures of said third member for cooperating with said anvil, and said cutting members and pins being removable as a unit to facilitate replacement as said cutting edges wear; and an operating lever rotatable about an axis having a handle and an annular extension, said annular extension having four arcuate quadrature disposed elongated slots, mounted in said depressed area of said second member with each of said arcuate slots mating with one of said plurality of pins, each of said arcuate slots being symmetrical about a radius perpendicular to and passing through said axis of rotation, and each of said arcuate elongated slots being of such arc and position that the radii from the axis of rotation of said lever to the extremities of each of said slots are longer than any radius to an intermediate point on the inner edges of said slot, whereby a single rotary motion of said operating lever and said arcuate slots through an acute angle causes reciprocating shuttling motion of said cutting members across said elongated apertures in said third member to cut riser wires extending therethrough.

References Cited in the file of this patent

UNITED STATES PATENTS

| | | |
|---|---|---|
| 610,213 | White | Sept. 6, 1898 |
| 695,354 | Wagner et al. | Mar. 11, 1902 |
| 857,284 | Huber | June 18, 1907 |
| 1,981,059 | Matthews et al. | Nov. 20, 1934 |
| 2,106,274 | Frayer et al. | Jan. 25, 1938 |
| 2,570,919 | Clifford | Oct. 9, 1951 |
| 2,620,031 | Swift | Dec. 2, 1952 |